United States Patent
Zhang et al.

(10) Patent No.: US 11,843,559 B2
(45) Date of Patent: Dec. 12, 2023

(54) BEAM FAILURE RECOVERY FOR USER EQUIPMENT COMMUNICATING WITH MULTIPLE TRANSMISSION AND RECEPTION POINTS

(71) Applicant: Apple Inc., Cupertino, CA (US)

(72) Inventors: Yushu Zhang, Beijing (CN); Chunxuan Ye, San Diego, CA (US); Dawei Zhang, Saratoga, CA (US); Haitong Sun, Irvine, CA (US); Huaning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 17/438,912

(22) PCT Filed: Jan. 13, 2021

(86) PCT No.: PCT/CN2021/071383
§ 371 (c)(1),
(2) Date: Sep. 13, 2021

(87) PCT Pub. No.: WO2022/151005
PCT Pub. Date: Jul. 21, 2022

(65) Prior Publication Data
US 2022/0271887 A1    Aug. 25, 2022

(51) Int. Cl.
*H04L 5/00* (2006.01)

(52) U.S. Cl.
CPC .......... *H04L 5/0051* (2013.01); *H04L 5/0032* (2013.01)

(58) Field of Classification Search
CPC ............................ H04L 5/0051; H04L 5/0032
See application file for complete search history.

(56) References Cited

U.S. PATENT DOCUMENTS

| | | | |
|---|---|---|---|
| 2019/0306765 A1 | 10/2019 | Cirik et al. | |
| 2020/0350972 A1* | 11/2020 | Yi | H04L 1/12 |

(Continued)

FOREIGN PATENT DOCUMENTS

| | | |
|---|---|---|
| CN | 110677909 A | 1/2020 |
| CN | 111278122 A | 6/2020 |
| CN | 111837346 A | 10/2020 |

OTHER PUBLICATIONS

International Search Report for PCT/CN2021/071383; dated Sep. 28, 2021.

*Primary Examiner* — Derrick V Rose
(74) *Attorney, Agent, or Firm* — Kowert, Hood, Munyon, Rankin & Goetzel, P.C.

(57) ABSTRACT

A user equipment (UE) may establish communication with a plurality of transmission reception points (TRPs) and determine one or more beam failures associated with a first or second TRP based on reference signals received from the first and second TRPs. The UE may then transmit a scheduling request requesting resources for indicating the beam failures associated with the first TRP or second TRPs. Upon receiving a response to the scheduling request allocating resources, the UE may then transmit, using allocated resources, a beam failure indication of the first one or more beam failures associated with the first TRP or second TRP. After receiving a beam failure response from the first or second TRP, the UE may then communicate with the first TRP and the second TRP using one or more new beams based on the beam failure indication and the beam failure response.

20 Claims, 8 Drawing Sheets

(56) References Cited

U.S. PATENT DOCUMENTS

| | | | |
|---|---|---|---|
| 2021/0135740 A1* | 5/2021 | Zhou | H04W 72/23 |
| 2022/0109489 A1* | 4/2022 | Zhu | H04L 1/1896 |
| 2022/0132517 A1* | 4/2022 | Zhu | H04L 5/0094 |

* cited by examiner

BEAM FAILURE RECOVERY FOR USER EQUIPMENT COMMUNICATING WITH MULTIPLE TRANSMISSION AND RECEPTION POINTS

PRIORITY CLAIM INFORMATION

This application is a national stage application of International Application No. PCT/CN2021/071383, filed on Jan. 13, 2021, titled "Beam Failure Recovery for User Equipment Communicating with Multiple Transmission and Reception Points", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for performing a beam failure recovery procedure during communications involving multiple transmission and reception points in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the robustness and accuracy of transmitted and received signals through user equipment (UE) devices, e.g., through wireless devices such as cellular phones, base stations and relay stations used in wireless cellular communications.

For example, one particular issue that can arise in cellular communication systems is referred to as beam failure. Beam failure may occur when the reference signal receive power (RSRP) of a beam with which a UE is currently communicating falls below a threshold. When this occurs, the UE may need to acquire a new beam to maintain communication with the cellular network. The ability of a UE to recover from a beam failure is very important for the user experience. Accordingly, improvements in the field are desired.

SUMMARY

Embodiments are presented herein of apparatuses, systems, and methods for performing beam failure recovery in a cellular communication system using multiple transmission and reception points. According to the techniques described herein, scheduling requests may be configured to support beam failure recovery involving the UE in communication with a plurality of transmission and reception points.

In various embodiments, a user equipment (UE) may establish communication with a plurality of transmission reception points (TRPs) including a first TRP and second TRP. The UE may then determine a first one or more beam failures associated with the first TRP based on one or more reference signals received from the first TRP. Additionally, the UE may determine a second one or more beam failures associated with the second TRP based on one or more reference signal received from the second TRP. The UE may then transmit a scheduling request requesting resources for indicating the first one or more beam failures associated with the first TRP and the second one or more beam failures associated with the second TRP. Upon receiving a response to the scheduling request allocating resources, the UE may then transmit, using the allocated resources, a beam failure indication of the first one or more beam failures associated with the first TRP and the second one or more beam failures associated with the second TRP. Furthermore, upon receiving a beam failure response in response to the indication, the UE may then communicate with the first TRP and the second TRP using one or more new beams based on the beam failure indication and the beam failure response.

In other embodiments, the UE may be further configured to determine one or more candidate beams by monitoring one or more candidate reference signals transmitted by one or more TRPs of the plurality of TRPs. Additionally, the UE may transmit, in the beam failure indication, information regarding the one or more candidate beams to TRPs to which it is connected. The TRPs receiving this information may further transmit this information to other TRPs of the plurality of TRPs. In various aspects, the UE may transmit a single scheduling request or alternatively more than one scheduling request to the plurality of TRPs. In some embodiments, the scheduling request may be configured in RRC or in MAC CE.

In various aspects, the UE may communicate with the first and second TRPs using the one or more new beams at the same time or, alternatively, at different times. Moreover, the UE may communicate with the first TRP at a first time if the scheduling request was transmitted to the first TRP. Alternatively, the UE may communicate with the first TRP using the one or more new beams if the scheduling request was transmitted to the second TRP.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
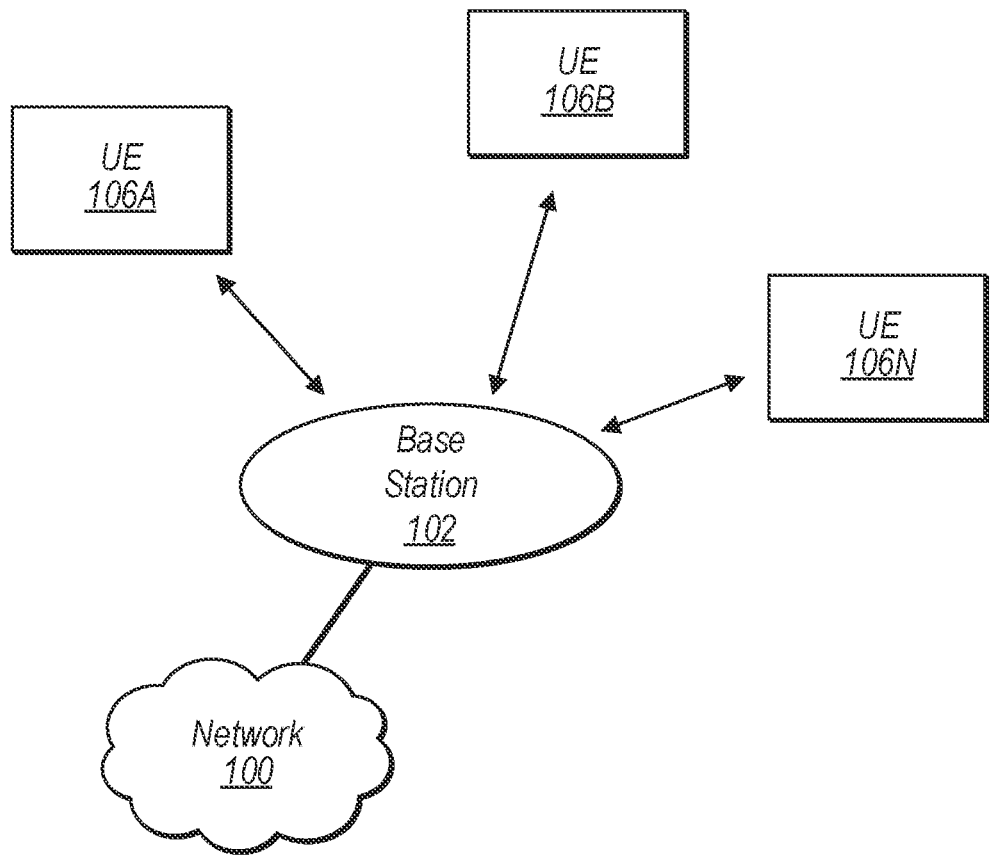
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
CBRA: Contention Based Random Access
BFRQ: Beam Failure Recovery Request
BFRR: Beam Failure Recovery Response
BFD RS: Beam Failure Detection Reference Signal
CBD RS: Candidate Beam Detection Reference Signal
SSB: Synchronization Signal Block
CSI-RS: Channel State Information Reference Signal
RSRP: Reference Signal Receive Power
SINR: Signal-to-interference Plus Noise
BLER: Block Error Rate
TRP: Transmission and Reception Point
PUCCH: Physical Uplink Control Channel
PUSCH: Physical Uplink Shared Channel
QCL: Quasi-Colocated
CORESET: Control Resource Set
MAC: Medium Access Control
CE: Control Element
SR: Scheduling Request
RRC: Radio Resource Control
DCI: Downlink Control Information Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs+ are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™M), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
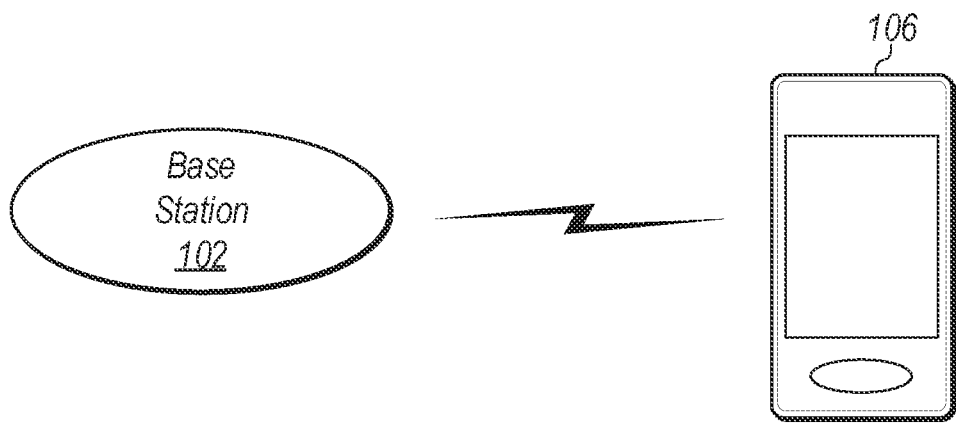
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 may also be configured to be camped on and communicate with multiple base stations concurrently. In some embodiments, the UE 106 may be configured to perform cross-cell beam failure recovery using a contention based random access procedure, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
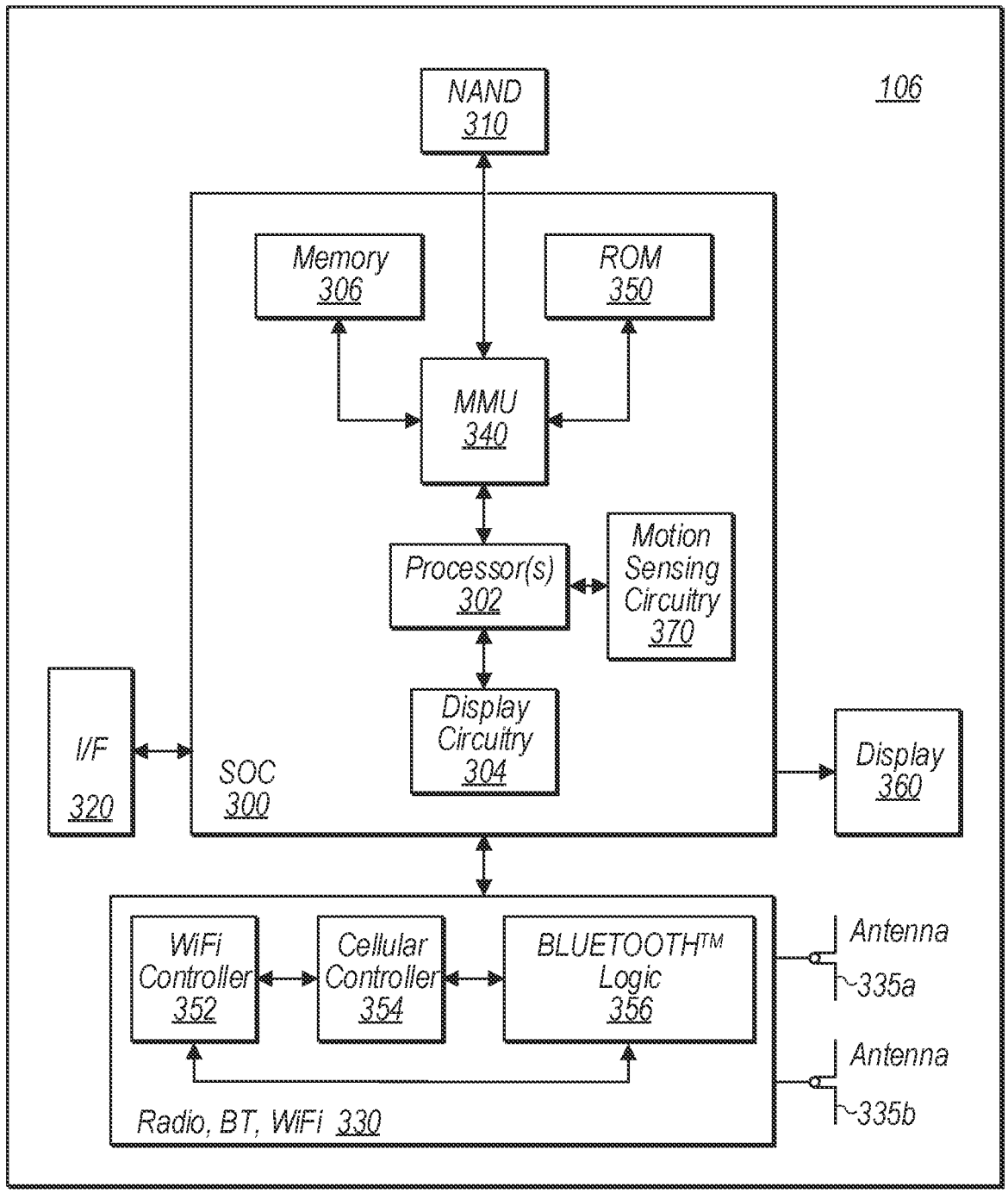
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery using a contention based random access procedure such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments may have fewer or more similar controllers for various different RATs that may be implemented in UE device 106.

Figure 4:
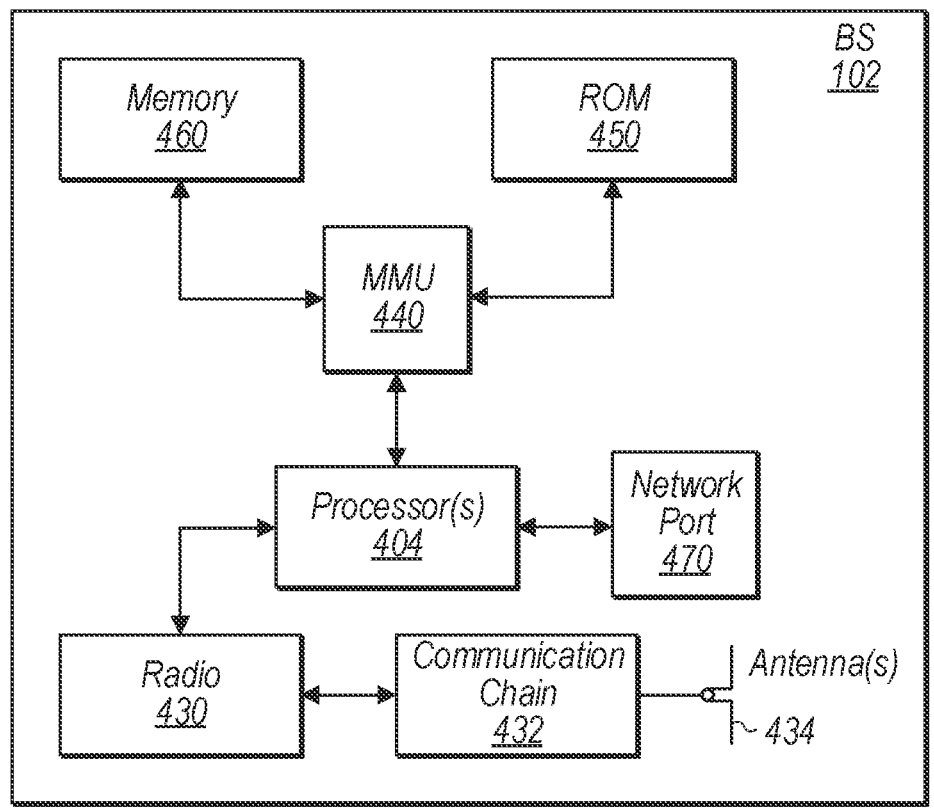
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may also be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for providing control signaling for use in performing beam failure recovery in a cellular communication system.

Figure 5:
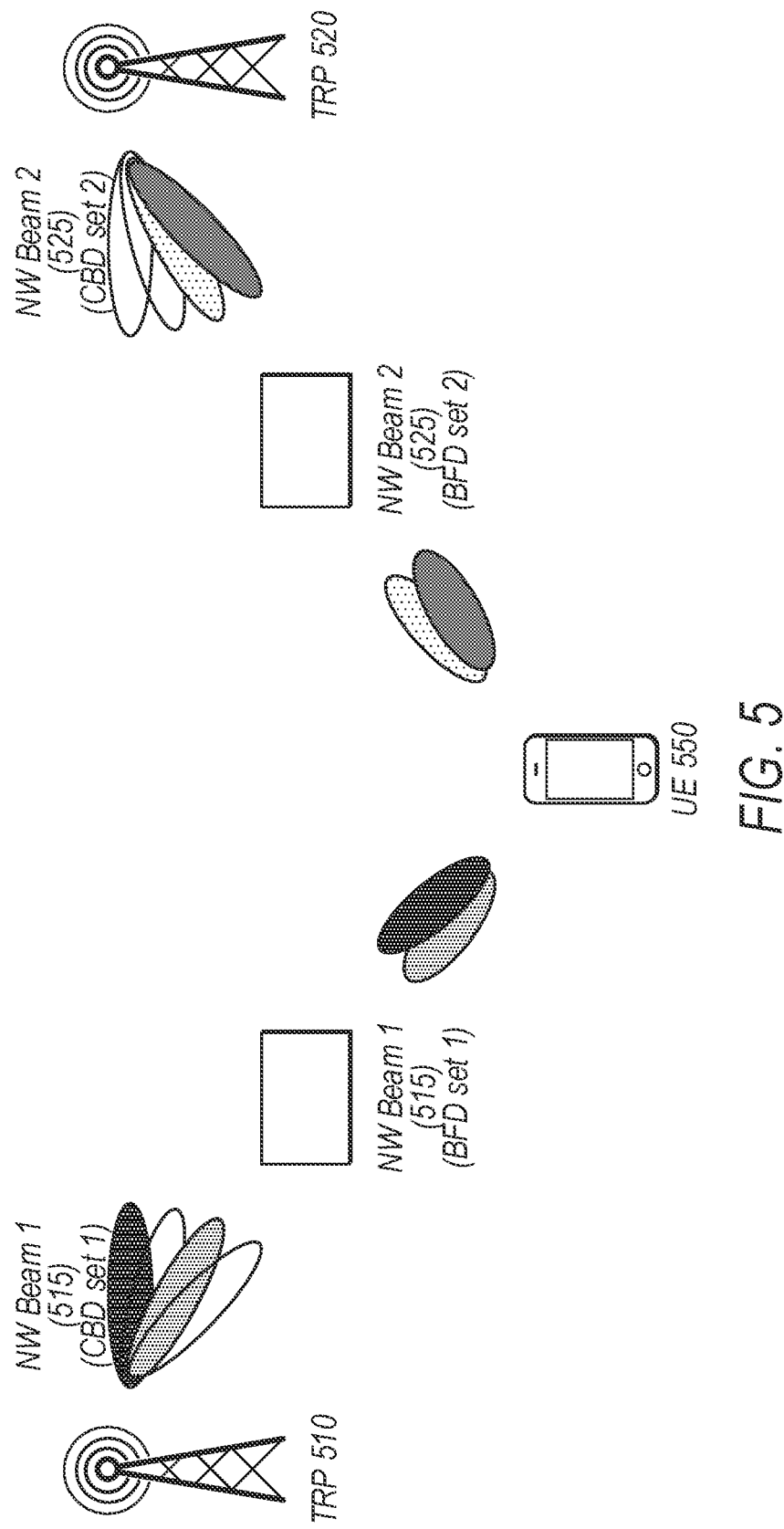
FIG. 5 illustrates UE communication involving multiple transmission and reception points and signaling related to beam failures, according to some embodiments.

FIG. 5—UE Communication Involving Multiple TRPs

FIG. 5 is a high-level network diagram illustrating interactions between wireless devices (e.g., cellular base stations comprised of one or more transmission and reception points (TRPs) 510 and 520 and a wireless user equipment (UE) device 550, as shown, as one possibility) to communicate with each other in a cellular communication system, according to some embodiments. Specifically, FIG. 5 deals with a UE 550 communicating in an environment with multiple transmission and reception points (multi-TRPs) 510 and 520 where the UE is capable of performing beam failure recovery with a beam of the one or more TRPs to which the UE is currently connected.

FIG. 5 depicts a UE 550 in communication with TRP 510 and TRP 520 as part of a multi-TRP connection involving a UE and one or more transmission and reception points. NW Beam 1 (515), within a beam failure detection (BFD) set 1, may be used for communication between TRP 510 and UE 550, and NW Beam 2 (525), within a BFD set 2, may be used for communication between TRP 520 and UE 550. In the illustrated example, UE 550 may be in communication with both TRP 510 and TRP 520, e.g., concurrently or simultaneously, by utilizing NW Beam 1 (515) and NW Beam 2 (525) respectively.

Additionally, TRP 510 and TRP 520 may both provide configuration information for beam failure detection to UE 550. More specifically, TRP 510 may provide to UE 550 a candidate list of physical cell identifiers of possible or candidate TRPs which can be used for beam failure detection and/or selection in case of a beam failure event. In other words, the TRP 510 may configure the UE 550 with a candidate list of TRPs on which to perform candidate beam detection in case one or both NW Beam 1 (515) and NW Beam 2 (525), to which the UE 550 is currently communicating, encounter beam failures. For example, the list of candidate TRPs that TRP 510 provides to the UE 550 for beam failure detection may be a set comprising {TRP 510, TRP 520} because these are the two TRPs to which the UE 550 is currently connected. In some embodiments, the list of candidate TRPs may include additional TRP(s) within range of the UE 550.

In some embodiments, the list of candidate base stations provided to the UE 550 for beam failure detection may also be provided by TRP 520 through NW Beam 2 (525). This list may also be a set comprising {TRP510, TRP 520}. In other words, in the illustrated example of FIG. 5, the candidate list of TRPs comprises {TRP 510, TRP 520} where in the event of a beam failure the UE 550 performs detection of beams including NW Beam 1 (515) on TRP 510 and NW Beam 2 (525) on TRP 520 in addition to other beams that may be associated with TRP 510 or TRP 520, e.g., within BFD set 1 and/or BFD set 2. Thus, it may be noted that one or more base stations may include TRP 510 and/or TRP 520 and may also be configured with multiple other beams for communication with the UE 550.

In some aspects, TRPs may transmit beam failure detection (BFD) and candidate beam detection (CBD) reference signals (RS), e.g., for use by the UE 550 and/or other UEs.

More specifically, TRPs 510 and 520 may transmit BFD and/or CBD reference signals to UE 550 via various beams, including NW Beam 1 (515) and NW Beam 2 (525). These reference signals may be analyzed by the UE in order to identify beam failures and potential candidate beams for future communications. Moreover, the beam failure detection reporting from the UE may include desired candidate beams based on the UE's detection of those beams. In other words, the UE may perform candidate beam selection based on the analyzed reference signals and report it to the TRP or base station. In other aspects, the TRPs or base stations may indicate a different candidate beam for the UE to use in its response. In other words, the network may select a candidate beam that is the same or different from the one indicated by the UE. Moreover, the UE may opt to not report a candidate beam to the TRP or base station. In this case, the TRP or base station may assign a candidate beam without input from the UE.

For example, the UE may detect the failure of both NW Beam 1 (515) and NW Beam 2 (525) separately, by measuring a signal strength of a BFD reference signals corresponding to TRP 510 and TRP 520, and comparing the signal strength(s) of the received reference signal(s) to a failure threshold. The signal strength may be measured as a reference signal receive power (RSRP) or signal-to-interference plus noise (SINR) or hypothetical block error rate (BLER) of the reference signal. If the signal strength for any of NW Beam 1 (515) or NW Beam 2 (525) is measured to be lower than the failure threshold for a certain number of times (e.g., one or more times), then the UE 550 may determine that the corresponding beam for which the signal strength is lower than the failure threshold has encountered a beam failure.

In some embodiments, upon detecting beam failures for each of the beams to which the UE 550 is currently connected, the UE 550 may begin candidate beam detection by monitoring the signal strength of a beam belonging to one or more TRPs in the candidate list, e.g., using CBD RS transmitted on the corresponding beams. For example, the UE 550 may begin candidate beam detection on a candidate beam as soon as UE 550 determines that NW Beam 1 (515) has encountered a beam failure. Alternatively, or additionally, UE 550 may begin candidate beam detection on a candidate beam as soon as UE 550 determines that NW Beam 2 (525) has encountered a beam failure. Moreover, UE 550 may perform a candidate beam selection of an additional beam when both NW Beam 1 (515) and NW Beam 2 (525) have experienced beam failures and a signal strength of a CBD reference signal being transmitted by the additional beam exceeds a success threshold. The reference signal for beam failure detection may be a Synchronization Signal Block (SSB) and/or Channel State Information Reference Signal (CSI-RS) being transmitted by the candidate TRP. As briefly mentioned above, the UE may report this beam failure detection including desired candidate beams to the TRP or base station.

NW Beam 1 (515) may also be the beam on which UE 550 receives broadcast information with beam sweeping operation on control resource set index 0 (CORESET #0). If the UE 550 detects that NW Beam 1 (515) has encountered a beam failure, then the UE 550 may switch to receiving CORESET #0 from another beam, upon completion of successful beam failure recovery.

In some aspects, beam failure recovery for multi-TRP operation may include steps similar to beam failure recovery for single-TRP operation. For example, in regard to single-TRP operation, the UE may perform beam failure detection (BFD) by detecting the hypothetical block error ratio (BLER) for the Synchronization Signal Block (SSB) and/or Channel State Information Reference Signal (CSI-RS) Quasi-Colocated (QCLed) with a Control Resource Set (CORESET). Additionally, the UE may perform candidate beam detection (CBD) where if the control channel beam fails, the UE may identify a new candidate beam whose layer-1 reference signal receive power (L1-RSRP) is above a certain threshold. Moreover, the UE may transmit a beam failure recovery request (BFRQ) in which the UE reports the failed component carrier (CC) index and the candidate beam index to the base station by MAC CE. Furthermore, a dedicated scheduling request (SR) may be configured to request resources for a MAC CE transmission. Alternatively, if the SR is not configured, the UE may use a contention based random access (CBRA) procedure. Finally, as part of the beam failure recovery response (BFRR), the base station may transmit a PDCCH scheduling a new transmission to the UE using the same HARQ process as the PUSCH used by the UE for the MAC CE transmission. Additionally, in the case that the beam failure recovery has been triggered by CBRA, the BFRR may be Msg4 from the base station. In other words, the PDCCH transmitted by the base station may be associated with C-RNTI.

For multi-TRP operation, the UE may receive downlink signals from different TRPs with the same or different UE panels or antennas and both ideal-backhaul or non-ideal backhaul based networks may be supported. For multi-TRP operation involving two TRPs, there may be two different scenarios of beam failures. The first scenario involves the case where only one TRP fails. Accordingly, the second scenario involves the case where both TRP fail. In these scenarios, the base station may configure two sets of beam failure detection reference signals (BFD RS) and two sets of candidate beam detection reference signals (CBD RS) with each set corresponding to a respective TRP.

In some embodiments, the UE may use a single dedicated scheduling request (SR) configuration for both ideal and non-ideal backhaul scenarios. For example, if a multi-TRP SR collides with a SR for another purpose, the multi-TRP SR may be prioritized. In other aspects, if the multi-TRP SR collides with a SR for a single-TRP beam failure recovery, the prioritization of the multi-TRP SR or single-TRP SR may be predefined or configured by the base station.

Alternatively, with regard to the non-ideal backhaul scenario, multiple dedicated SRs may be configured such that each SR corresponds to one TRP (e.g., BFD/CBD set). Accordingly, the PUCCH resource for the SR should also correspond to one TRP. Moreover, in regard to single-TRP beam failure recovery involving single and multiple SRs, there may be several options for collision handling. For example, in some embodiments, the UE may expect the SRs to be with PUCCH resources that are non-overlapping the time domain. Moreover, this previous example may be considered as an error case. In other aspects, the SR with a higher priority may be transmitted. For example, the SR's priority may be determined by an associated TRP index, schedulingRequestId, or PUCCH resource index. In some embodiments, higher layer signaling (e.g., RRC signaling) may configure which SR is to be transmitted.

Aspects of the network of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the network of wireless devices depicted in FIG. 5 may be used in any suitable wireless communication system, as desired.

Figure 6:
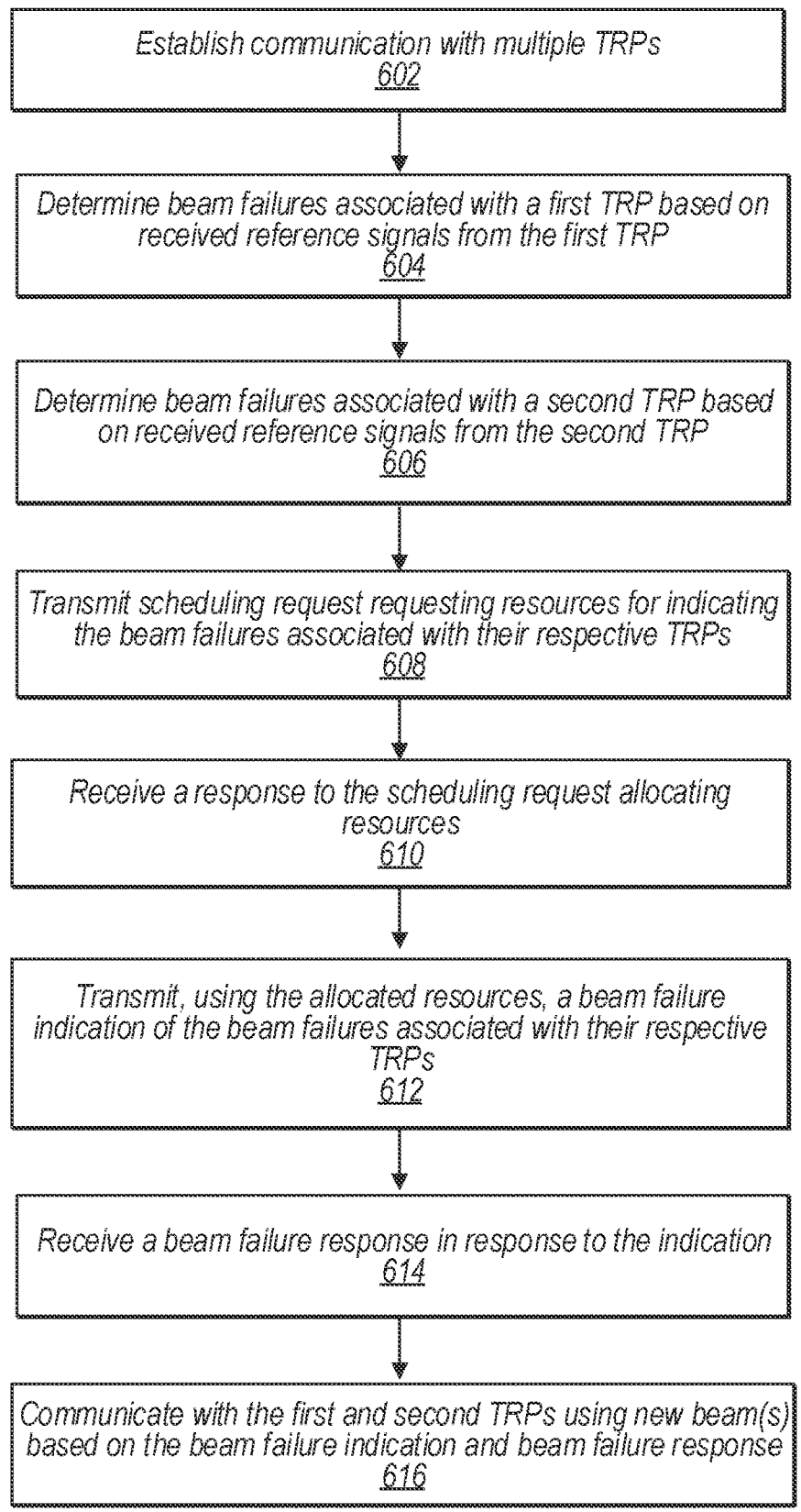
FIG. 6 is a flowchart illustrating the procedure for beam failure recovery for a UE communicating with multiple transmission and reception points by utilizing a single scheduling request, according to some embodiments.

FIG. 6—Beam Failure Recovery Procedure for a UE Communicating with Multiple TRPs Utilizing a Single Scheduling Request FIG. 6 is a flowchart illustrating aspects of an example procedure for performing beam failure recovery. In particular, FIG. 6 illustrates a beam failure recovery procedure for a UE communicating with multiple TRPs by utilizing a single scheduling request, according to some embodiments. As briefly mentioned above, beam failure may occur when the reference signal receive power (RSRP) of a beam with which a UE is currently communicating falls below a threshold. When this occurs, the UE may need to acquire a new beam to maintain communication with the cellular network. The ability of a UE to recover from a beam failure is very important for the user experience and FIG. 6 illustrates an example of how a UE may perform such a recovery using a scheduling request.

Aspects of the method of FIG. 6 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

At 602, the UE may establish communication with multiple transmission and reception points (TRPs). These TRPs may be a part of one or more base stations (e.g., gNBs) and the communications may include radio resource control (RRC) signaling, MAC CE content, downlink control information (DCI), reference signals concerning beam failure recovery, and/or other signaling. By communicating with multiple TRPs rather than a single TRP, the UE has expanded options when considering or evaluating which beams with which to communicate with. These expanded options can allow the UE to more effectively and efficiently communicate with the TRPs and/or base stations in the case of one or more beam failures.

In 604, the UE may then determine beam failures associated with a first TRP based on received reference signals from the first TRP. For example, as briefly discussed above in regard to FIG. 5, the UE may detect or determine a beam failure by measuring a signal strength of a reference signal received from the first TRP. More specifically, the UE may monitor one or more beam failure detection reference signals (BFD RS) transmitted from the first TRP. The BFD RS may be a Synchronization Signal Block (SSB) and/or Channel State Information Reference Signal (CSI-RS). This signal strength value may be measured as a reference signal receive power (RSRP) or signal-to-interference plus noise (SINR) or hypothetical block error rate (BLER) of the reference signal. The UE may then compare this signal strength value to a failure threshold. If the signal strength value is measured to be lower than the failure threshold for a certain number of times (one or more times), then the UE may determine that the corresponding beam for which the signal strength is lower than the failure threshold has encountered a beam failure.

In some embodiments, the failure threshold may be configured differently for different base stations or TRPs. For example, the failure threshold for a first TRP may be configured differently from the failure threshold of a second TRP to take into account different characteristics of the first TRP and the second TRP (for example, the first TRP may be a pico cell while the second TRP may be a macro cell, with differences in transmit power between the two TRPs, among other possible differences.)

The UE may determine that a candidate beam on any of the one or more TRPs passes a candidate beam selection criterion when the monitored signal strength of the CBD RS from the candidate beam exceeds a success threshold. The success threshold may be configured for the beams belonging to each TRP in the candidate list. For example, the signal strength may be measured as a reference signal receive power (RSRP) of the CBD RS. The signal strength used in measuring the CBD RS may be similar to the options described above in measuring the BFD RS. In some embodiments, the success threshold is the same for all the TRPs that the UE is monitoring for candidate beams (for example, the threshold is the same for beams associated with TRP 1 and TRP 2 as illustrated in FIG. 5.) In other embodiments, the success threshold may be configured differently for some of the one or more TRPs in the candidate list. For example, the success threshold for a first TRP may be configured differently from the success threshold of a second TRP to take into account different characteristics of the first and second TRPs, as previously described. In other words, the success threshold of a first TRP may be the same as a second TRP (or other TRPs), or it may be different. Thus, the UE determines that the CBD RS from a TRP has passed the candidate beam selection criterion on a particular SSB or CSI-RS that was monitored by the UE. The success threshold may be the same as or different than the beam failure threshold.

Similarly, in step 606, the UE may undergo the same process as outlined above (with regard to determining beam failures corresponding to a first TRP) to determine beam failures associated with a second TRP based on received reference signals from the second TRP. More specifically, the UE may monitor for BFD RS from the second TRP and compare these signal strength values to a failure threshold in order to determine beam failures associated with the second TRP. Additionally, the UE may then perform candidate beam detection by monitoring CBD RS from the second TRP and compare these signal strength values to a success threshold in order to identify a candidate beam, e.g., of the first or second TRPs, with which to utilize for future communications.

Proceeding to step 608, the UE may then transmit a scheduling request requesting resources for indicating the beam failure(s) associated with their respective TRPs. More specifically, the UE may report determined beam failures and candidate beams in order to further determine which TRP to communicate with for subsequent communications. In order to do so, the UE may transmit the scheduling request to a TRP or base station for the purpose of utilizing allocated resources to report said beam failures. For example, if the UE determines that one or more beams corresponding to a first TRP have failed and one or more candidate beams associated with a second TRP have successfully fulfilled a signal strength criterion, the UE may elect to communicate this determined information to a TRP or base station using resources that have been requested via the scheduling request. In some embodiments, the UE may only be able to transmit one scheduling request at a time to one or more TRPs or base stations. Accordingly, the UE may be configured to use a single scheduling request for requesting resources to report beam failures of multiple TRPs. Alternatively, as discussed below regarding FIG. 9, multiple scheduling requests may be used for requesting resources to report beam failures of multiple TRPs (e.g., one scheduling request per TRP).

In step 610, the UE may receive a response to the scheduling request allocating resources. In other words, the first or second TRP (or one or more base stations) may transmit a response to the UE's scheduling request which may include allocated resources for the UE to utilize. As briefly mentioned above, these allocated resources may be used by the UE to transmit information regarding beam failures or candidate beams corresponding to the communications between the UE and the TRPs. Note that while the present embodiments envision the use of a scheduling request for obtaining resources for reporting beam failures, the UE may be configured to report the beam failures using resources already allocated to the UE, e.g., without the need to transmit a scheduling request to reserve those resources.

Accordingly, in step 612, the UE may then transmit, using the allocated resources indicated by the TRP or base station in response to the scheduling request, a beam failure indication of the beam failures associated with their respective TRPs. This transmission may include information regarding beam failures associated with one or more TRPs. The base station may then use this information for subsequent communications with the UE or other TRPs that may be involved (currently or in the future) in communication with the UE. For example, the information sent by the UE in the beam failure indication may include information regarding candidate beams which may be usable by the TRP and UE with regard to candidate beam selection as part of a beam failure recovery procedure. Additionally, in some aspects, the beam failure indication may be reported by MAC CE.

In step 614, the UE may receive a beam failure response from the TRP or base station to which it transmitted the beam failure indication to. In other words, once the TRP or base station received the beam failure indication, the TRP or base station may further transmit a response to the UE as part of the beam failure recovery procedure. For example, this response may include information usable by the UE in determining a new beam to be used in subsequent communications with the TRPs. This new beam may have improved transmission characteristics and may have already been vetted by the UE during the candidate beam detection comparison as described above in regards to FIG. 5.

Lastly, in step 616, the UE may communicate with the first and second TRPs using one or more new beams based on the beam failure indication and the beam failure response. In other words, having relayed information regarding beam failures to the TRPs or associated base station(s) and received a response to said relayed information, the UE may then use this information to communicate with the first and second TRPs using one or more new beams that have been identified, vetted, and selected for said communications. Thus, having successfully completed the beam failure recovery procedure involving multiple transmission and reception points, the UE may re-establish communications with the first and second TRPs using one or more new beams. In some embodiments, this re-established communication with the first and second TRPs using the one or more new beams may occur simultaneously or consecutively. In other words, the UE may communicate with the first TRP using the one or more new beams at a first time and communicate with the second TRP using the one or more new beams at a second time.

In some embodiments, the UE may be configured to transmit a single SR and may utilize MAC CE to report single or multi-TRP beam failures. This report may include failed serving cell index(es), candidate beam detection reference signal (CBD RS) index(es), statuses for each beam failure detection reference signal (BFD RS) index(es) (e.g., a 2-bit bit-map which may indicate which TRPs have failed), and a 2-bit bit-map indicating whether a new beam has been identified from each CBD RS set. In other embodiments, the UE may utilize a singular MAC CE to indicate one TRP beam failure or two MAC CEs to indicate that both TRPs have experienced beam failures. These reports may also include failed serving cell index(es), a failed BFD RS set index, a CBD RS index, or whether a new beam has been identified from the CBD RS set. In other aspects, the UE may utilize MAC CE to report single or multi-TRP beam failures as detailed above with the exception that the SR may not be configured. In the case of an unconfigured SR, the UE may follow a contention based random access (CBRA) procedure in order to address a beam failure.

In some embodiments, the UE may be configured to transmit more than one SR and may utilize MAC CE to report single or multi-TRP beam failures. For example, in one embodiment, the MAC CE may be reported by a PUSCH transmission associated with the failed TRP. This report may include failed serving cell index(es), CBD RS index(es) selected from the set of the failed TRP, and whether a new beam has been identified from the CBD RS set of the failed TRP. Additionally, a prohibit timer associated with the SR and corresponding to the failed TRP may only be reset once the UE has received an uplink grant from the failed TRP in a component carrier (CC). In some aspects, the MAC CE may be reported by a PUSCH transmission associated with any TRP. This report may also include failed serving cell index(es), failed BFD RS set index(es), CBD RS index(es), and whether a new beam has been identified from the CBD RS set.

Alternatively, the MAC CE may be reported by a PUSCH transmission associated with a non-failed TRP which may include failed serving cell index(es), CBD RS index(es) from the set of the failed TRP, and whether a new beam has been identified from the CBD RS set of the failed TRP. For example, if a first beam associated with a first TRP fails, the UE may be configured to communicate the beam failure to a second TRP that the UE is already in communication with, as opposed to communicating the beam failure to the first TRP as in other embodiments.

Additionally, a prohibit timer associated with the SR and corresponding to the failed TRP may only be reset once the UE has received an uplink grant from the non-failed TRP in a component carrier (CC). In other embodiments, higher layer signaling such as radio resource control or MAC-CE may configure the UE such that the MAC-CE is reported by a PUSCH associated with the failed TRP, any TRP, or non-failed TRP.

Figure 7:
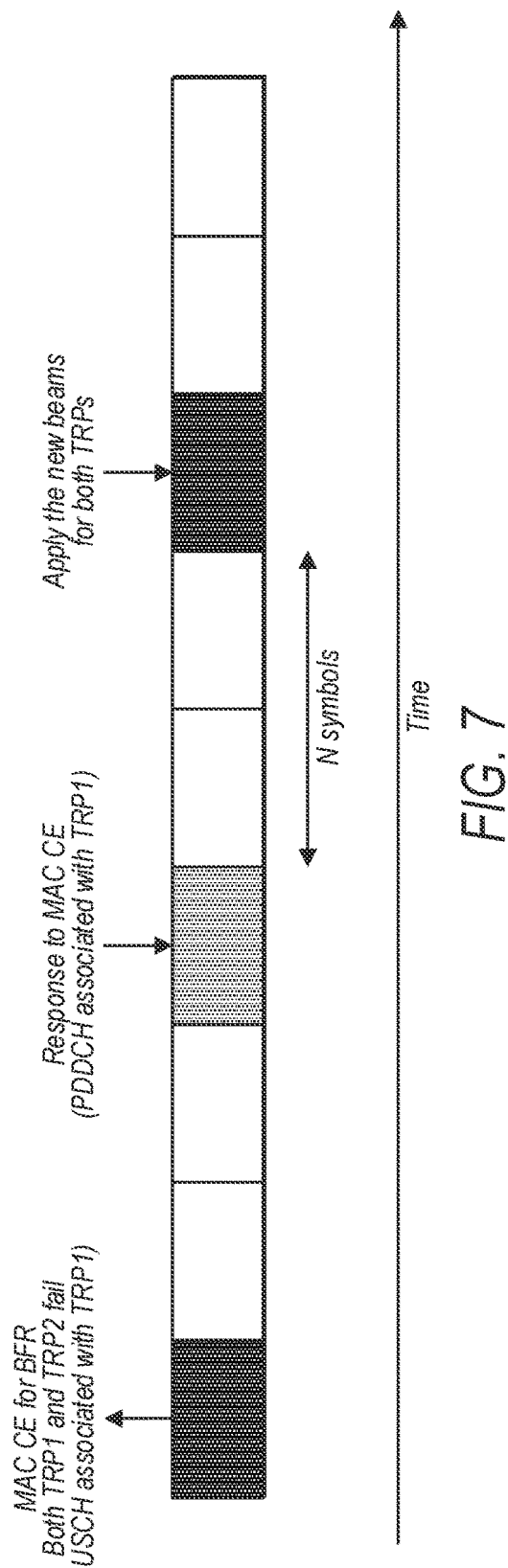
FIGS. 7 and 8 are timelines illustrating, for a single scheduling request configuration, a UE's behavioral options after receiving a beam failure recovery response from a base station, according to some embodiments.
Figure 8:
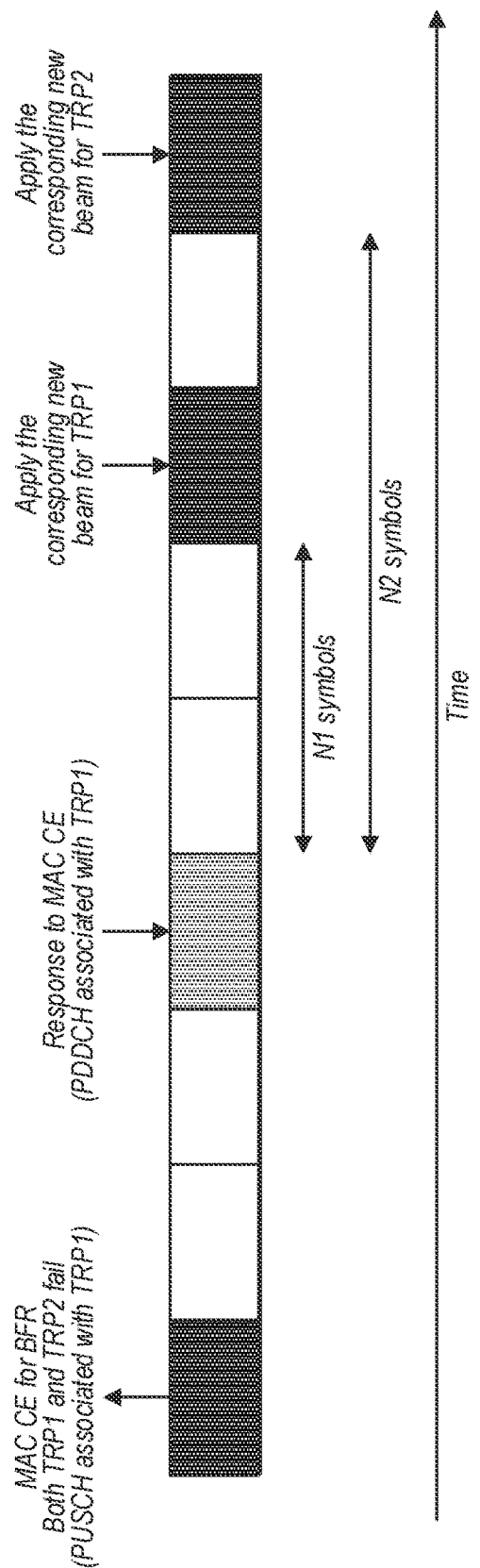

FIGS. 7 and 8—Single SR Configuration Behavioral Options for UE Post-BFRR

FIGS. 7 and 8 illustrate a timeline of a UE, utilizing a single SR configuration, and its behavior or options after receiving the beam failure recovery response, according to some embodiments. For example, in one aspect shown in FIG. 7, a UE may be communicating with two TRPs and experience beam failures corresponding to both TRPs. The UE may then transmit (via PUSCH) a scheduling request configured in MAC CE to one of the TRPs (TRP 1, for example) for the beam failure recovery. After receiving a response to the MAC CE (via PDCCH associated with TRP 1), which may indicate which new beams the UE should use for TRP 1 and/or TRP 2, e.g., via CBD index(es), the UE may then apply the new beams for both TRPs. In other words, after receiving the response to the MAC CE and after a certain number of symbols N (e.g., N=28), the UE may apply a newly identified beam for the reported CBD RS index(es) to receive PDCCH and/or transmit PUCCH (when spatial relation is not configured) for both the corresponding failed TRP beams (TRP 1 and TRP 2).

In another aspect shown in FIG. 8, after a certain number of symbols, N1 (e.g., N1=28), a UE may apply a newly identified beam for the reported CBD RS index(es) to receive PDCCH and/or transmit PUCCH (when spatial relation is not configured) for the corresponding failed TRP once the MAC CE has been reported or the response to the MAC CE has been received. Additionally, after a certain number of symbols N2 (N2 being greater than or equal to N1), the UE may apply a newly identified beam for the reported CBD RS index(es) to receive PDCCH and/or transmit PUCCH (when spatial relation is not configured) for the corresponding failed TRP if the MAC CE has not been reported or the response to the MAC CE has not been received. In other words, a UE may be communicating with two TRPs and experience beam failures corresponding to both TRPs. The UE may then transmit a scheduling request configured in MAC CE to one of the TRPs (TRP 1, for example) for the beam failure recovery. After receiving a response to the MAC CE (via PDCCH associated with TRP 1), the UE may then apply the corresponding new beam for TRP1 after a first amount of time (e.g., N1 symbols) and then apply the corresponding new beam for TRP 2 after a second amount of time (e.g., N2 symbols). In some embodiments, the delay shown in FIG. 8 may allow the TRP1 to communicate the indicated new beam that the UE should use in communicating with TRP2 to TRP2. Thus, the delay may allow TRP2 to be able to ensure that the UE and TRP2 can successfully communicate using the new beam.

Additionally, N1 and N2 may be predefined or configured by RRC signaling or may be determined by the UE's hardware and processing capability. Furthermore, the UE may apply the new beam to other channels as well such as PDSCH, CSI-RS, SRS, and PUSCH.

Figure 9:
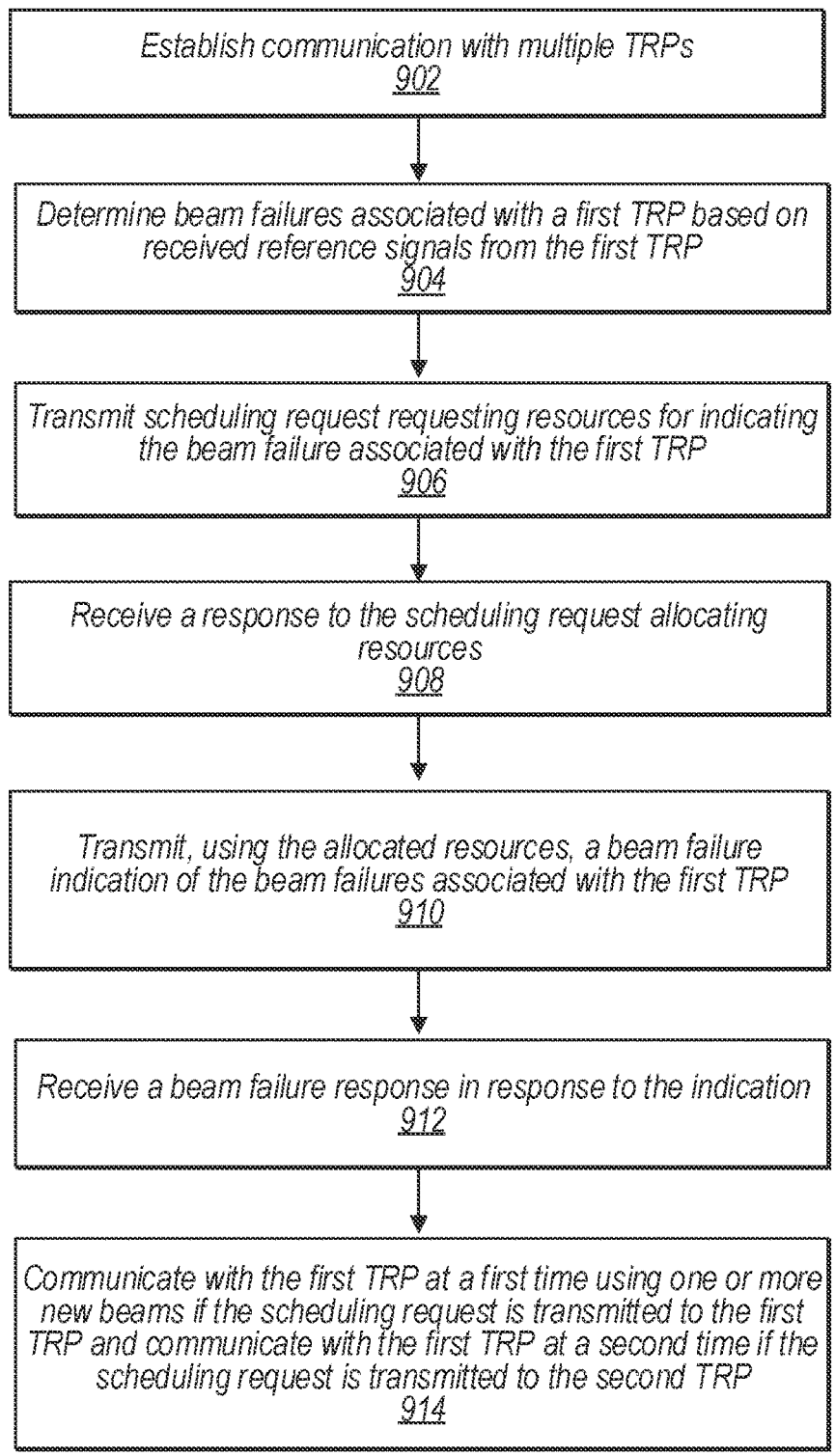
FIG. 9 is a flowchart illustrating the procedure for beam failure recovery for a UE communicating with multiple transmission and reception points by utilizing more than one scheduling request, according to some embodiments.

FIG. 9—Beam Failure Recovery Procedure for a UE Communicating with Multiple TRPs Utilizing More Than One Scheduling Request FIG. 9 is a flowchart illustrating aspects of another example procedure for performing beam failure recovery. In particular, FIG. 9 illustrates a beam failure recovery procedure for a UE communicating with multiple TRPs by utilizing more than one scheduling request, according to some embodiments. As briefly mentioned above, beam failure may occur when the reference signal receive power (RSRP) of a beam with which a UE is currently communicating falls below a threshold and thus the UE may need to acquire a new beam to maintain communication with the cellular network. This recovery process is very important for the user experience and FIG. 9 illustrates an example of how a UE may perform such a recovery by using more than one scheduling request.

Aspects of the method of FIG. 9 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

First, in step 902, the UE may establish communication with multiple transmission and reception points (TRPs). These TRPs may be a part of one or more base stations (e.g., gNB) and the communications may include radio resource control (RRC) signaling. By communicating with multiple TRPs rather than a single TRP, the UE has expanded options when considering or evaluating which beams with which to communicate with. These expanded options can allow the UE to more effectively and efficiently communicate with the TRPs and/or base stations in the case of one or more beam failures.

Next, in step 904, the UE may then determine beam failures associated with a first TRP based on received reference signals from the first TRP. For example, as briefly discussed above in regard to FIG. 6, the UE may detect or determine a beam failure by measuring a signal strength of a reference signal received from the first TRP and may then compare this signal strength value to a failure threshold. If the signal strength value is measured to be lower than the failure threshold, then the UE may determine that the corresponding beam for which the signal strength is lower than the failure threshold has encountered a beam failure. As detailed above in regard to FIG. 6, the UE may also perform candidate beam detection by monitoring the signal strength of a beam belonging to one or more TRPs in the candidate list and may determine that a candidate beam on any of the one or more TRPs passes a candidate beam selection criterion when the signal strength of the CBD RS from the candidate beam exceeds a success threshold. Thus, the UE may elect to perform subsequent communications using the candidate beam having determined that it exceeded a success threshold.

In step 906, the UE may then transmit a scheduling request requesting resources for indicating the beam failures associated with their respective TRPs. In other words, the UE may wish to transmit beam information to one or more TRPs or base stations as part of a beam failure recovery procedure. In order to do so, the UE may transmit said scheduling request to a base station or TRP to request resources for a subsequent beam failure indication transmission. More specifically, the UE may utilize and transmit information to the base station or TRP regarding the determined beam failures and candidate beams to further determine which TRP to communicate with for subsequent communications. For example, if the UE determines that one or more beams corresponding to a first TRP have failed and one or more candidate beams associated with a second TRP have successfully fulfilled a signal strength criterion, the UE may elect to communicate to the second TRP using the newly vetted beam. In some embodiments, the UE may only be able to transmit one scheduling request at a time to one or more TRPs or base stations. As previously described, the beam failure detection reporting from the UE may include desired candidate beams based on the UE's detection of those beams. In other aspects, the TRPs or base stations may indicate a same or different candidate beam for the UE to use. In other words, the network may select a candidate beam that is the same or different from the one indicated by the UE as a candidate beam. Furthermore, in other aspects, the UE may opt to not report a candidate beam to the TRP or base station. In this scenario, the TRP or base station may be configured to assign a candidate beam without input from the UE.

Proceeding to step 908, the UE may receive a response to the scheduling request allocating resources. In other words, the first or second TRP (or one or more base stations) may transmit a response to the UE's scheduling request which may include allocated resources for the UE to utilize. For example, these allocated resources may be further used by the UE to transmit information or indications regarding potential beam failures corresponding to the communications between the UE and the TRPs.

In step 910, the UE may then transmit, using the allocated resources indicated by the TRP or base station in response to the scheduling request, a beam failure indication of the beam failures associated with the first TRP. This transmission may include information regarding beam failures associated with the first TRP. The base station may then use this information for subsequent communications with the UE or other TRPs who may be involved (currently or in the future) in communication with the UE. For example, the information sent by the UE in the beam failure indication may include information usable by the TRP and UE with regard to a beam failure recovery procedure.

Accordingly, in step 912, the UE may receive a beam failure response from the first TRP or base station to which it transmitted the beam failure indication to. In other words, once the first TRP or base station received the beam failure indication, the first TRP may further transmit a response to the UE as part of the beam failure recovery procedure. For example, this response may include information usable by the UE in determining a new beam to be used in subsequent communications with the first or second TRPs. This new beam may have improved transmission characteristics and may have already been vetted by the UE during the candidate beam detection comparison as described above in regard to FIG. 5.

Lastly, in step 914, the UE may communicate with the first TRP using one or more new beams based on the beam failure indication and the beam failure response. Additionally, the UE may communicate with the first TRP using the one or more new beams at a first time if the scheduling request was transmitted to the first TRP. In other aspects, the UE may communicate with the first TRP using the one or more new beams at a second time if the scheduling request was transmitted to the second TRP. In other words, after a certain time, the UE may apply the one or more new beams as previously mentioned if the failed TRP is the not the same as the beam failure recovery responding TRP.

Figure 10:
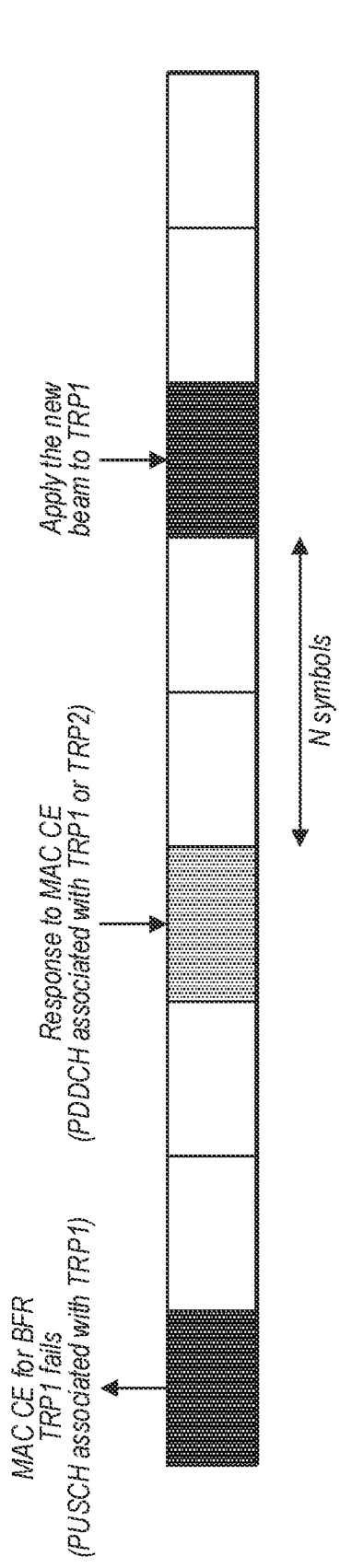
FIGS. 10 and 11 are timelines illustrating, for a multiple scheduling request configuration, a UE's behavioral options after receiving a beam failure recovery response from a base station, according to some embodiments.
Figure 11:
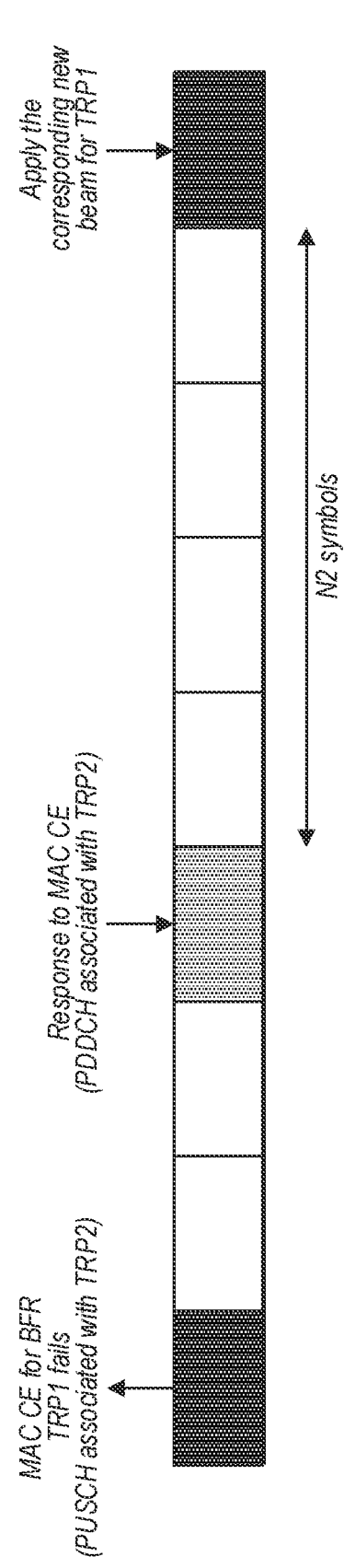

FIGS. 10 and 11—Multiple SR Configuration Behavioral Options for UE Post-BFRR FIGS. 10 and 11 illustrate a timeline of a UE, utilizing a multiple SR configuration, and its behavior or options after receiving the beam failure recovery response, according to some embodiments. For example, in one aspect shown in FIG. 10, a UE may be communicating with two TRPs and experience a beam failure corresponding to one TRP (TRP 1, for example). The UE may then transmit a scheduling request to one of the TRPs (TRP 1, for example) for the beam failure recovery. Upon receiving an allocation in response to the scheduling request, the UE may transmit an indication of beam failure (e.g., via MAC CE). After receiving a response to the MAC CE (e.g., via PDCCH associated with TRP 1 when the transmissions are to TRP1), the UE may then apply the new beam(s) to TRP 1. For example, after receiving the beam failure recovery response from the base station and after a certain number of symbols N (e.g., N=28), the UE may apply the beam for the reported CBS RS index(es) to receive PDCCH and/or transmit PUCCH transmissions (when spatial relation is not configured) for the corresponding failed TRP. In other words, after a certain number of symbols, the UE may apply the beam as previously mentioned if the failed TRP is the same as the transmitting TRP for the MAC CE response.

In another aspect shown in FIG. 11, after a certain number of symbols, N2 (where N2 is greater than or equal to N1, where N=N1=28 symbols), the UE may apply the beam as previously mentioned if the failed TRP is the not the same as the transmitting TRP for the response to the MAC CE. For example, a UE may be communicating with two TRPs and experience a beam failure corresponding to one TRP (TRP 1, for example). The UE may then transmit a scheduling request to the non-failed TRP (TRP 2, for example) for the beam failure recovery. Upon receiving an allocation in response to the scheduling request, the UE may transmit an indication of beam failure (e.g., via MAC CE). After receiving a response to the MAC CE (e.g., via PDCCH associated with TRP 2), the UE may then apply the new beam(s) to TRP 1. As noted above, the delay may be longer when applying the new beam for a TRP that is different from the one that the UE is communicating the failure to. Moreover, similar to the single SR configuration response as detailed in FIGS. 7 and 8, N1 and N2 may be predefined or configured by RRC signaling or may be determined by the UE's hardware and processing capability and the UE may apply the beam to other channels as well such as PDSCH, CSI-RS, SRS, and PUSCH.

In another embodiment, after the UE receives the beam failure recovery response based on the timelines of FIGS. 7-10, the UE may have additional behavioral options with regard to uplink power control for physical uplink control channel (PUCCH) transmissions. For example, the UE may apply certain common power control parameters sets (e.g., P0, alpha, closed-loop index) to the PUCCH associated with the newly identified or selected candidate beam. Alternatively, some power control parameters such as closed-loop index should be separately applied to the PUCCH associated with the newly identified or selected beam. For example, PUCCH resources associated with a first beam should be based on a first closed loop index, and PUCCH resources associated with a second beam should be based on a second closed-loop index. In other embodiments, the UE may separately apply multiple power control parameter sets (e.g., P0, alpha, closed-loop index) to the PUCCH associated with the newly identified or selected beams. In one specific example, the pathloss reference signal for power control may be based on the newly identified beam for the corresponding PUCCH resources.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, a first transmission reception point (TRP) may be configured to establish communication with a user equipment (UE). Additionally or alternatively, the UE may be configured to communicate with a second TRP. According to some embodiments, the first TRP may be further configured to receive a scheduling request requesting resources for indicating the first one or more beam failures associated with the second TRP. Additionally or alternatively, the first TRP may be further configured to transmit a response to the scheduling request allocating resources and receive a beam failure indication of the first one or more beam failures associated with the second TRP. Accordingly, the first TRP may be further configured to transmit a beam failure response in response to the indication and transmit information to the second TRP indicating one or more new beams to be used by the second TRP for subsequent communications with the UE, according to some embodiments. Additionally or alternatively, the second scheduling request may be received at the second TRP after the first scheduling request is received at the first TRP. In some embodiments, the beam failure indication may be configured in MAC CE. Additionally or alternatively, the one or more new beams may be applied based on common power control parameters including P0, alpha, or closed-loop index. In some embodiments, a first beam of the one or more new beams may be applied based on a first closed-loop index and a second beam may be applied based on a second closed-loop index.

What is claimed is:

1. An apparatus, comprising:
at least one processor configured to cause a user equipment (UE) to:
establish communication with a plurality of transmission reception points (TRPs) including a first TRP and second TRP;
receive a configuration including a first beam failure detection reference signal (BFD RS) set corresponding to the first TRP, a second BFD RS set corresponding to the second TRP, and at least one dedicated scheduling request associated with beam failure indication for one or more of the first and second BFD RS sets;
transmit the at least one dedicated scheduling request requesting resources for indicating a first one or more beam failures associated with the first BFD RS set and a second one or more beam failures associated with the second BFD RS set;
receive a response to the at least one dedicated scheduling request allocating resources;
transmit, using the allocated resources, a beam failure indication in a medium access control— control element (MAC-CE) of the first one or more beam failures associated with the first BFD RS set and the second one or more beam failures associated with the second BFD RS set, wherein the beam failure indication includes indications of at least one of:
indexes of one or more failed serving cells,
an index of the first BFD RS set indicating failure of the first BFD RS set,
whether a first new beam is identified from a first candidate beam detection reference signal (CBD RS) set,
an index of the second BFD-RS set indicating failure of the second BFD RS set,
whether a second new beam is identified from a second CBD RS set, or
indexes of the first and second new beams;

receive a beam failure response in response to the indication; and communicate with the first TRP and the second TRP using one or more new beams based on the beam failure indication and the beam failure response.

2. The apparatus of claim 1, wherein the at least one processor is further configured to cause the UE to:
determine one or more candidate beams by monitoring one or more candidate reference signals transmitted by one or more TRPs of the plurality of TRPs.

3. The apparatus of claim 2, wherein the at least one processor is further configured to cause the UE to:
transmitting, in the beam failure indication, information regarding the one or more candidate beams.

4. The apparatus of claim 3, wherein:
the beam failure indication further indicates one or more candidate beams to the first TRP and one or more other candidate beams to the second TRP.

5. The apparatus of claim 1, wherein the at least one dedicated scheduling request is a single scheduling request.

6. The apparatus of claim 5, wherein the single scheduling request is configured by radio resource control (RRC) or MAC-CE.

7. The apparatus of claim 1, wherein the at least one processor is further configured to cause the UE to:
communicating with the first TRP using the one or more new beams at a first time and communicating with the second TRP using the one or more new beams at a second time.

8. A wireless device, comprising:
wireless communication circuitry; and
at least one processor coupled to the wireless communication circuitry, wherein the at least one processor is configured to cause the wireless device to:
establish communication with a plurality of transmission reception points (TRPs) including a first TRP and second TRP;
determine a first one or more beam failures associated with the first TRP, wherein said determining the first one or more beam failures is based on one or more reference signals received from the first TRP;
transmit a scheduling request requesting resources for indicating the first one or more beam failures associated with the first TRP, wherein the scheduling request is transmitted to the first TRP at a first time based at least in part on the scheduling request having a higher priority;
receive a response to the scheduling request allocating resources;
transmit, using the allocated resources, a beam failure indication of the first one or more beam failures associated with the first TRP;
receive a beam failure response in response to the indication; and
communicate with the first TRP using one or more new beams based on the beam failure indication and the beam failure response.

9. The wireless device of claim 8, wherein the scheduling request is transmitted to the second TRP at a second time, wherein the second time is later than the first time associated with transmitting the scheduling request to the first TRP.

10. The wireless device of claim 8, wherein the scheduling request is transmitted to the first TRP and wherein said communicating with the first TRP is performed at the first time.

11. The wireless device of claim 8, wherein the at least one processor is further configured to:
determine one or more candidate beams by monitoring one or more candidate reference signals transmitted by one or more TRPs.

12. The wireless device of claim 11, wherein the at least one processor is further configured to:
transmit, in the beam failure indication, information regarding the one or more candidate beams.

13. The wireless device of claim 8, wherein the beam failure indication is reported by MAC CE.

14. The wireless device of claim 8, wherein a priority of the scheduling request is configured by RRC signaling or determined by an associated TRP index, schedulingRequestId, or PUCCH resource index.

15. A method, comprising:
establishing communication with a plurality of transmission reception points (TRPs) including a first TRP and second TRP;
determining a first one or more beam failures associated with the first TRP, wherein said determining the first one or more beam failures is based on one or more reference signals received from the first TRP;
transmitting a scheduling request requesting resources for indicating the first one or more beam failures associated with the first TRP, wherein the scheduling request is transmitted to the first TRP at a first time based at least in part on the scheduling request having a higher priority;
receiving a response to the scheduling request allocating resources;
transmitting, using the allocated resources, a beam failure indication of the first one or more beam failures associated with the first TRP;
receiving a beam failure response in response to the indication; and
communicating with the first TRP using one or more new beams based on the beam failure indication and the beam failure response, wherein said communicating with the first TRP using the one or more new beams is performed at a first time when said transmitting the scheduling request is performed to the first TRP and wherein said communicating with the first TRP using the one or more new beams is performed at a second time when said transmitting the scheduling request is performed to the second TRP.

16. The method of claim 15, further comprising:
determining one or more candidate beams by monitoring one or more candidate reference signals transmitted by one or more TRPs.

17. The method of claim 16, further comprising:
transmitting, in the beam failure indication, information regarding the one or more candidate beams.

18. The method of claim 15, wherein a priority of the scheduling request is configured by RRC signaling or determined by an associated TRP index, schedulingRequestId, or PUCCH resource index.

19. The method of claim 15, wherein the scheduling request is transmitted to the second TRP at the second time, wherein the second time is later than the first time associated with transmitting the scheduling request to the first TRP.

20. The method of claim 15, wherein the scheduling request is transmitted to the first TRP and wherein said communicating with the first TRP is performed at the first time.

* * * * *